United States Patent [19]

Stewart

[11] 3,737,030
[45] June 5, 1973

[54] PREVENTION OF GAUGE BANDS IN ROLLS OF FILM

[75] Inventor: Donald F. Stewart, Whippany, N.J.

[73] Assignee: Allied Chemical Corporation, New York, N.Y.

[22] Filed: Oct. 27, 1971

[21] Appl. No.: 192,986

[52] U.S. Cl. .............................. 206/59 E, 242/68.5
[51] Int. Cl. ........................ B65d 85/67, B65h 75/02
[58] Field of Search ...................... 206/58, 59 R, 59 E; 242/68.5, 68.6

[56] References Cited

UNITED STATES PATENTS 2,916,226  12/1959  McGraw, Jr. ...................... 242/68.5
3,179,245  4/1965  Bastian, Jr. ...................... 242/68.5 X
3,433,355  3/1969  Smith ............................ 242/68.5 X

*Primary Examiner*—George E. Lowrance
*Assistant Examiner*—Steven E. Lipman
*Attorney*—Jonathan Plaut and Roger H. Criss

[57] ABSTRACT

A core used in winding plastic film provided with a compressible liner at areas of the core which tend to develop gauge bands when plastic film is wound in a roll about the core. The liner rests in an undercut portion of the core. The core is capable of preventing gauge band formation in plastic film wound thereabout.

11 Claims, 6 Drawing Figures

PREVENTION OF GAUGE BANDS IN ROLLS OF FILM

BACKGROUND OF THE INVENTION

1. Field of the Invention

This invention relates to the formation and winding of plastic films, particularly extruded plastic films which are wound on rolls.

2. Description of the Prior Art

In the process of forming plastic films, it is often difficult to precisely control the uniformity of film thickness ("gauge"). As a result, products such as extruded plastic films at times possess areas of increased thickness due to variations in the cross-sectional size of the extruding die or other factors. For example, in extruding a flat plastic film one point or portion of the extruding die slot may be of a slightly greater cross-section than that desired which results in an area of slightly increased cross-section in the film extending along the longitudinal axis of the film. When such films are wound about a core or mandrel for storage or shipment, the effect of the superimposition of even minor variations in thickness in each convolution is reflected, especially in the outer windings, as heavy or thick circumferential bands, commonly referred to as gauge bands. Such gauge bands, which generally are ridges exhibiting a color darker than the remainder of the plastic film, tend to cause the film, primarily the outer wraps thereof, to distort and stretch at the thicker sections during winding and following removal of the winding tension. It is found that upon unwinding such distortion is permanent whereby the utility of the film for converting into bags or for printing or other purposes is impaired.

As another example, plastic film used as shrinkage film is generally stretched during processing to impart the desired molecular orientation characteristics to the film. As a result of this stretching, marginal sections of the film tend to be of a thicker gauge than the center portions of the film. These marginal sections may cause gauge bands to form in the marginal portions of a roll of the film.

One present procedure for eliminating gauge bands in the final product is to rewind the film on the roll and slit to remove the distorted areas of the film. This procedure is costly due to the necessity for rewinding the film and wastage due to cutting. Attempts have been made in the past, with varying degrees of success, to prevent gauge bands from forming in rolls of plastic film. For example, extruding molds have been provided with rotating or shifting means in order to circumferentially rotate or laterally oscillate the blown or flat film during extruding. This results in a circumferential or lateral shifting of the thicker areas of the plastic film such that when the film is wound as a roll on a core, the thicker areas of each convolution or series of convolutions are displaced along the longitudinal axis (i.e., width) of the roll rather than directly overlying and building upon the thicker areas of previous windings. In this manner, gauge band formation is prevented. Both flat and circular molds and/or their respective forming and/or collecting rolls have been provided with lateral shifting means. The addition of such means to existing mold lines, however, involves substantial expenditures.

It has been proposed in U.S. Pat. No. 3,249,216, issued May 3, 1966 to Phillips et al., to eliminate hard circumferential bands in rolls of plastic film by including a particulate material between adjacent convolutions. This procedure, however, requires an additional step during the winding process and a very careful application of extraneous material to the film. When particulate material is applied to a film having a clinging or tacky surface, such as plastic film used for meat packaging, it was found that the film often lost its desired tackiness. In addition, in certain instances other desired surface properties of such film were impaired, such as sealability. It has been proposed in U.S. Pat. No. 3,390,762, issued July 2, 1968 to Mernieks to prevent irregularities due to distortion of the leading edge of plastic film as it is wound about the core from reflecting in and resulting in damage to subsequent layers by including a foamed insert in part in contiguous relation with the core and in part over the leading edge of the film or between the first circumvolutions of the film. The solution to this problem also requires an additional step during the winding operation and a very careful application of an extraneous material during winding.

OBJECTS OF THE INVENTION

An object of this invention is to provide a relatively low cost, effective means of preventing gauge bands from forming in plastic films.

Another object of this invention is to provide a gauge band-preventing means which can be incorporated into existing commercial plastic film production lines without substantial capital expenditure and without adding an additional step requiring careful control to the winding operation.

Other objects and advantages of the invention may be apparent from the description which follows or from the drawings.

SUMMARY OF THE INVENTION

Formation of gauge bands in rolls of plastic film is substantially prevented by providing the supporting winding core or mandrel with undercut portions extending circumferentially around the core periphery which are filled with a liner formed of a compressible material. These filled undercut portions are provided at the locations on the core at which the gauge bands would otherwise form when the film is wrapped around the core. It is believed that when plastic film is wrapped about such selectively lined cores, the film is free to expand in the radially inward direction due to the nature of the liner material as well as expand in the radially outward direction due to the fact that the outer layer of the roll is under no restraint. As a result, there is little or no gauge band build-up because thickness irregularities in individual convolutions of the film are allowed to "even out" in both the radial inward and outward directions.

DESCRIPTION OF THE PREFERRED EMBODIMENTS

Figure 1:
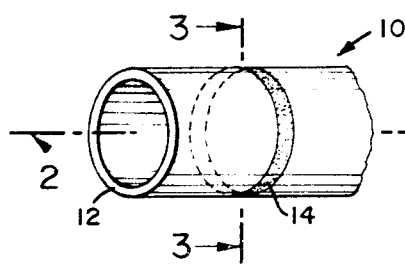
FIG. 1 is a perspective view of a winding core of this invention.
Figure 2:
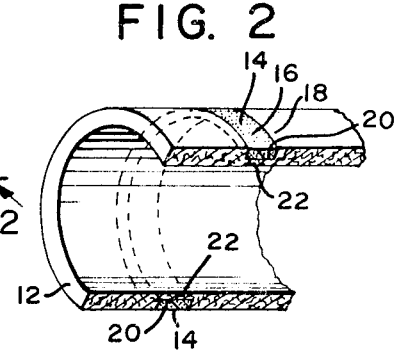
FIG. 2 is an enlarged view of a section along line 2—2 of FIG. 1 showing the relative position of the core liner and the core wall.
Figure 3:
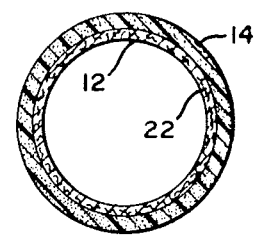
FIG. 3 is a cross-section view taken along line 3—3 of FIG. 1.

With reference to the drawings, particularly FIGS. 1–3, a winding core 10 having core walls 12 is provided with an undercut area 20 which is filled with a compressible liner material 14. Core 10 may be a paper tube which is conventionally used for winding plastic film but cores formed from other materials such as aluminum, fiber composition board, etc., may also be employed. The conventional paper tubes are generally of substantially cylindrical shape and have a wall thickness of about one-half inch and a diameter of about 3 to 6 inches, although of course these dimensions are not critical. Although a hollow core is shown in the drawings, the core could alternatively be non-hollow. An undercut or recessed portion 20 is provided in those areas of the core at which the plastic film to be wound thereabout tends to develop gauge bands. The manner of locating these areas is described below. Undercut area 20 may be of any suitable depth, for example about one-eighth to one-fourth inch in a paper core having a ½ inch wall thickness, such that a portion 22 of core wall 12 preferably lies beneath undercut portion 20. The thickness of undercut area 20 is generally dictated by the width of the corresponding gauge bands. The undercut portion which extends circumferentially around the periphery of the core, may suitably be and preferably is a groove formed in the core by a lathe or by other conventional techniques. Undercut portion 20 is filled with an annular piece of any compressible liner material 14 capable of yielding to the plastic film to be wrapped on the core. The liner material, preferably of a soft nature, may be an adhesive tape having a foam backing, corrugated or crimped paper wadding, rubber, foam rubber, foamed plastics and other materials exhibiting the desired properties. Also, compressible composite materials, such as laminated plastic film (e.g., polyethylene) having air pockets between the layers could be used. Preferably, liner 14 is a foam-backed adhesive tape, such as a polyurethane foam-backed adhesive tape, which is successively wound about undercut portion 20 to fill the undercut portion to a desired extent. As it is desired to provide a uniform radial thickness extending across the width of the core in order to encourage uniform gauge thickness of the film windings, the upper surface 16 of liner 14 should be substantially coplanar and level with the outer surface 18 of core wall 12 adjacent undercut area 20. That is, liner 14 should be applied to a depth such that the original core dimensions are maintained. Liner 14 may also be in the form of a ring or strip of compressible stock liner material which is inserted in undercut portion 20 and suitably fixed in place.

Plastic film 24 is convolutely wrapped about core or mandrel 10 by a conventional technique, such as by providing a moving sheet of plastic film and revolving the core, which is suitably mounted, to wind the film thereabout. At least a portion of the liner supports and is compressed by the plastic film wound about the core. This invention may be used in conjunction with plastic film made by any method, although it is particularly useful with extruded plastic film produced from a flat or circular die because gauge bands tend to be more exaggerated in extruded films. The plastic film itself may be of any film-forming composition, such as nylon, polyvinyl chloride, polyolefins such as polyethylene and polypropylene, polyesters, polyvinyl acetate, vinylidene chloride copolymers, cellulose, polyurethane and other plastic films, as well as rubber sheeting.

As mentioned above, liners 14 are provided at those areas on core 10 corresponding to areas of wrapped film 14 which tend to develop or form gauge bands. In some cases, the location of these areas can be adequately predetermined prior to winding. For instance, as described above plastic "shrink" film tends to laterally distort during the stretching with a consequent buildup of film thickness along marginal portions. To eliminate the tendency of these thicker portions to build upon each other and form gauge bands which distort the film especially in the outer windings, a marginal end or ends of the core are provided with undercut areas which are thereafter filled with a suitable liner material. Another situation in which the location of gauge band formation may be reasonably predetermined is in the winding of folded plastic film. The area surrounding the fold line tends to present an increased thickness when being wound. Therefore, the area of the core which supports the fold area of the wound film should be provided with the recessed liner of this invention.

In instances wherein the location of the gauge band areas cannot be predetermined to a satisfactory extent, the film may be wound on the core for a few revolutions to determine the location of the gauge bands. The core may then be unwound, undercut areas provided where required and a liner placed in the undercut areas. Alternatively, undercuts could be provided in a second core at the required areas and the film wound about this second core, with the first core being discarded. In this manner, by making a sample run with only a small amount of film material, the gauge band formation areas can be adequately located and provided with the undercut and liner of this invention such that a complete roll of film can then be wound which is substantially free of gauge bands.

Figure 4:
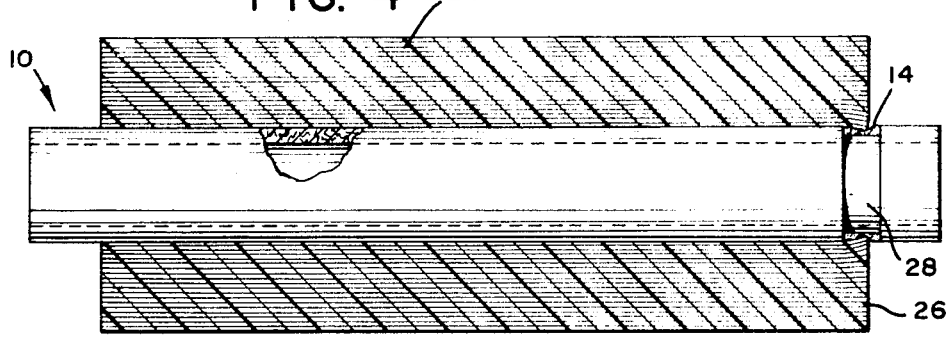
FIG. 4 is a side view of a roll of plastic film wound about a core of this invention.

FIG. 4 shows a roll of plastic film 24 wound about the improved core 10 of this invention in which a liner 14 is placed adjacent marginal end portion 28 of core 10. The core is generally wider than the roll of film. The plastic film has a marginal end portion 26 which has a slightly greater gauge and hence would otherwise tend to develop gauge bands at the marginal end portions of the roll. As shown in exaggerated view, liner 14 is compressed to a degree by the weight of wound film 24. Distortion forces during and following windings are allowed to encourage inward gauge growth as well as outward expansion of the film. Inward gauge growth is possible due to the compressible nature of the liner material. As a result, gauge bands are prevented from forming or they are present to a much less pronounced degree.

Figure 5:
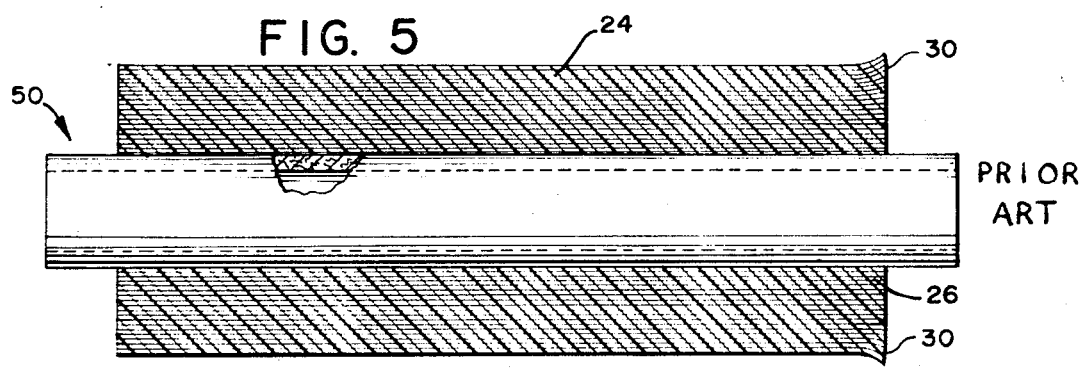
FIG. 5 is a side view of a roll of plastic film wound about a core which does not have an undercut portion.

FIG. 5 illustrates a roll of plastic film 24 wound about a conventional core 50 which is not provided with an undercut portion. This figure illustrates in an exaggerated view gauge band 30 which has formed due to the superimposition of slightly thicker marginal end portions 26 when film 24 is wound in a roll about core 50.

Figure 6:
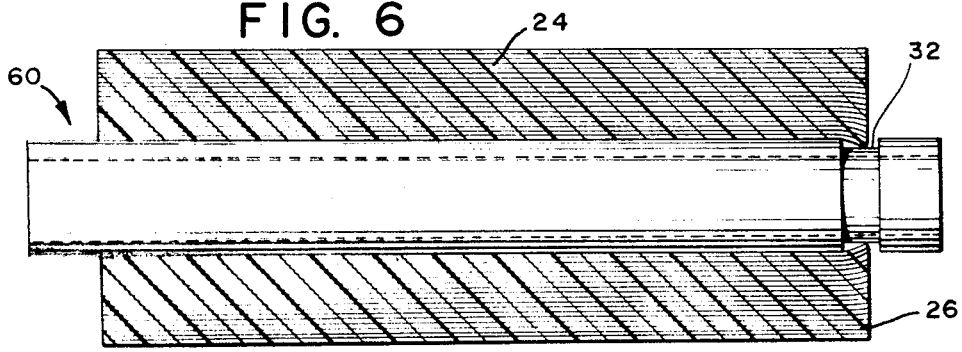
FIG. 6 is a side view of a roll of plastic film wound about a core which is provided with an undercut portion but without a liner inserted therein.

If a core or mandrel were provided with undercut portions without filling or lining such portions as herein disclosed, a roll of plastic material wound about such core would tend to distort into the undercut areas with resultant damage to the film. This is shown in FIG. 6 wherein it is apparent that inward convolutions of film 24 are distorted into the undercut groove 32 formed in core 60.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. A winding core adapted to be wound with a roll of film having variations in thickness across its width, said core being provided with an undercut portion extending circumferentially around the periphery of said core and a compressible liner filling said undercut portion, said undercut portion being located in an area of said core at which gauge bands would otherwise develop when said film is wound about said core.

2. The core of claim 1 wherein said film comprises plastic film.

3. The core of claim 2 wherein said undercut portion comprises a groove.

4. The core of claim 2 wherein said undercut portion and said liner are located adjacent a marginal end of said core and are adapted to support a marginal portion of said roll of film.

5. The core of claim 2 wherein said core has undercut portions adjacent both marginal edges thereof and wherein resilient liners fill said undercut portions.

6. The core of claim 2 wherein the outer surface of said liner is substantially coplanar with the outer surface of said core adjacent said undercut area.

7. The core of claim 2 wherein said core is substantially cylindrical in shape and is formed of paper.

8. The core of claim 2 wherein said liner is formed from material selected from the group consisting of foam-backed adhesive tape, corrugated or crimped paper wadding, rubber, foam rubber, foamed plastics and laminated plastic film having air pockets between the layers thereof.

9. A roll of plastic film wound in successive convolutions about a core, said core being provided with an undercut portion extending circumferentially around the periphery of said core and a resilient liner filling said undercut portion, at least a portion of said liner supporting and being compressed by said roll of plastic film.

10. A roll as claimed in claim 9 wherein said plastic film comprises polyvinyl chloride shrink film.

11. A roll as claimed in claim 10 wherein said core is substantially cylindrical in shape and is formed of paper.

* * * * *